United States Patent
He et al.

(10) Patent No.: US 12,192,909 B2
(45) Date of Patent: Jan. 7, 2025

(54) UPLINK DATA TRANSMISSION IN WIRELESS COMMUNICATIONS

(71) Applicant: Apple Inc., Cupertino, CA (US)

(72) Inventors: Hong He, San Jose, CA (US); Chunhai Yao, Beijing (CN); Chunxuan Ye, San Diego, CA (US); Dawei Zhang, Saratoga, CA (US); Haitong Sun, Cupertino, CA (US); Oghenekome Oteri, San Diego, CA (US); Seyed Ali Akbar Fakoorian, San Diego, CA (US); Sigen Ye, Whitehouse Station, NJ (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 470 days.

(21) Appl. No.: 17/593,509

(22) PCT Filed: Oct. 14, 2020

(86) PCT No.: PCT/CN2020/120970
§ 371 (c)(1),
(2) Date: Sep. 20, 2021

(87) PCT Pub. No.: WO2022/077292
PCT Pub. Date: Apr. 21, 2022

(65) Prior Publication Data
US 2022/0312336 A1    Sep. 29, 2022

(51) Int. Cl.
*H04W 52/14*     (2009.01)
*H04W 52/24*     (2009.01)
(Continued)

(52) U.S. Cl.
CPC ....... *H04W 52/146* (2013.01); *H04W 52/242* (2013.01); *H04W 52/365* (2013.01);
(Continued)

(58) Field of Classification Search
CPC . H04W 52/146; H04W 72/23; H04W 52/242; H04W 52/365; H04W 52/367; H04W 72/0446
See application file for complete search history.

(56) References Cited

U.S. PATENT DOCUMENTS 11,889,296 B2 *  1/2024  Fu ................. H04L 5/0094
2011/0092217 A1  4/2011  Kim et al.
(Continued)

FOREIGN PATENT DOCUMENTS

CN    107889209    4/2018
CN    110167181    8/2019
(Continued)

OTHER PUBLICATIONS

Nokia et al., "Remaining details on NR-U uplink signals and channels", 3GPP TSG RAN WG1 #99, R1-1912259, Nov. 9, 2019, 16 sheets.

*Primary Examiner* — Dai Phuong
(74) *Attorney, Agent, or Firm* — Fay Kaplun & Marcin, LLP

(57) ABSTRACT

A user equipment (UE) performs uplink (UL) transmissions to a network. The UE receives a frequency domain resource allocation (FDRA) configuration from a network, the FDRA configuration comprising at least one of a first FDRA mode or a second FDRA mode, wherein the first FDRA mode utilizes an FDRA unit comprising a set of consecutive resource blocks (RBs) and the second FDRA mode utilizes an FDRA unit comprising a set of interlaced RBs, when both of the first and second FDRA modes are configured, the UE
(Continued)

receives a signal indicating which one of the two FDRA modes are to be used for an uplink (UL) transmission and performs the UL transmission in accordance with the indicated FDRA mode.

18 Claims, 8 Drawing Sheets

(51) Int. Cl.
    *H04W 52/36*     (2009.01)
    *H04W 72/0446*     (2023.01)
    *H04W 72/23*     (2023.01)

(52) U.S. Cl.
    CPC ..... *H04W 52/367* (2013.01); *H04W 72/0446* (2013.01); *H04W 72/23* (2023.01)

(56) References Cited

U.S. PATENT DOCUMENTS

| | | | | |
|---|---|---|---|---|
| 2020/0367173 | A1* | 11/2020 | Ryu | H04W 76/27 |
| 2022/0046698 | A1* | 2/2022 | Zhao | H04W 72/23 |
| 2022/0377813 | A1* | 11/2022 | Wang | H04W 72/0453 |
| 2023/0105567 | A1* | 4/2023 | Zhao | H04L 27/2602 |
| | | | | 370/329 |

FOREIGN PATENT DOCUMENTS

| | | |
|---|---|---|
| CN | 110620645 | 12/2019 |
| CN | 110839291 | 2/2020 |
| CN | 111278127 | 6/2020 |
| WO | 2020/144639 | 7/2020 |

\* cited by examiner

UPLINK DATA TRANSMISSION IN WIRELESS COMMUNICATIONS

BACKGROUND INFORMATION

In current New Radio (NR) design, the minimum resource allocation granularity in the frequency domain is limited to one physical resource block (PRB). For unlicensed operation, maximum power spectral density (PSD) requirements exist in many different regions. The implication of the PSD requirement on the physical layer is that, without proper design, a signal with a small transmission bandwidth will be limited in transmission power. This can negatively affect the coverage of the operation.

For NR operation in 52.6 to 71 GHz, the impacts of phase noise on NR operations in this frequency range may be more pronounced than those on NR operations in FR2. The subcarrier spacing (SCS) may be increased to 480 kHz while balancing common phase error (CPE) and inter-symbol-interference (ISI) effects. Current UL transmission schemes may not ensure adequate UL coverage for a power boosting operation.

SUMMARY

Some exemplary embodiments are related to a processor configured to perform operations. The operations include receiving a frequency domain resource allocation (FDRA) configuration from a network, the FDRA configuration comprising at least one of a first FDRA mode or a second FDRA mode, wherein the first FDRA mode utilizes an FDRA unit comprising a set of consecutive resource blocks (RBs) and the second FDRA mode utilizes an FDRA unit comprising a set of interlaced RBs, when both of the first and second FDRA modes are configured, receiving a signal indicating which one of the two FDRA modes are to be used for an uplink (UL) transmission and performing the UL transmission in accordance with the indicated FDRA mode.

Other exemplary embodiments are related to a user equipment (UE) having a transceiver configured to connect to a base station and a processor communicatively coupled to the transceiver and configured to perform operations. The operations include receiving a frequency domain resource allocation (FDRA) configuration from the base station, the FDRA configuration comprising at least one of a first FDRA mode or a second FDRA mode, wherein the first FDRA mode utilizes an FDRA unit comprising a set of consecutive resource blocks (RBs) and the second FDRA mode utilizes an FDRA unit comprising a set of interlaced RBs, when both of the first and second FDRA modes are configured, receiving a signal indicating which one of the two FDRA modes are to be used for an uplink (UL) transmission and performing the UL transmission in accordance with the indicated FDRA mode.

Still further exemplary embodiments are related to a processor configured to perform operations. The operations include receiving a configuration to measure a downlink (DL) pathloss on a reference signal (RS) for each of a plurality of configured component carriers (CCs), measuring the DL pathloss on the RSs for each of the CCs and performing power headroom reporting (PHR) for the CCs associated with an active beam for an uplink (UL) transmission.

DETAILED DESCRIPTION

Figure 1:
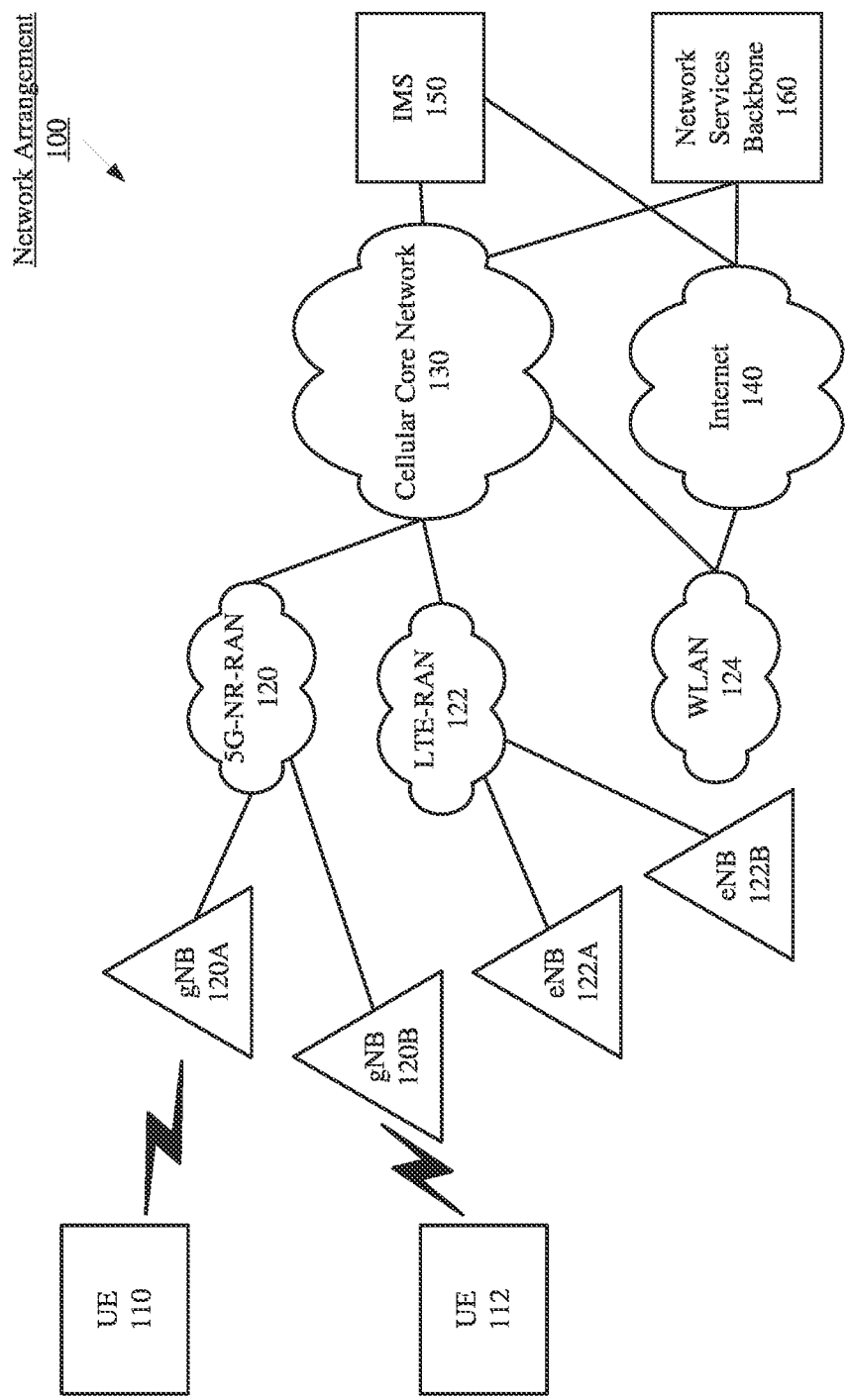
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments describe systems and methods for uplink (UL) data transmissions in a frequency range higher than FR2, e.g. in a 52.6 to 71 GHz range. Due to the impact of phase noise on NR operations in the 52.6 to 71 GHz frequency range, an interlace-based frequency domain resource allocation (FDRA) mode may be used for UL transmissions to ensure UL coverage by a power boosting operation. The exemplary embodiments further describe operations for signaling the FDRA mode to be used by the UE and power control operations such as power headroom reporting (PHR) using the interlace-based FDRA mode.

It should be understood that while the exemplary embodiments are described with respect to 5G NR operation in the 52.6 to 71 GHz frequency range, the exemplary embodiments are not limited to these conditions. The principles described herein for the exemplary embodiments may be applied to other frequency ranges (e.g., above or below the exemplary frequency range) and may also be applied to other types of wireless networks (e.g., other types of cellular or non-cellular wireless networks).

Network/Devices

FIG. 1 shows an exemplary network arrangement 100 according to various exemplary embodiments. The exemplary network arrangement 100 includes a plurality of UEs 110, 112. Those skilled in the art will understand that the UEs may be any type of electronic component that is configured to communicate via a network, e.g., a component of a connected car, a mobile phone, a tablet computer, a smartphone, a phablet, an embedded device, a wearable, an Internet of Things (IoT) device, etc. It should also be understood that an actual network arrangement may include any number of UEs being used by any number of users. Thus, the example of two UEs 110, 112 is merely provided for illustrative purposes. In some of the exemplary embodiments described below, groups of UEs may be employed to conduct respective channel measurements.

The UEs 110, 112 may communicate directly with one or more networks. In the example of the network configuration 100, the networks with which the UEs 110, 112 may wirelessly communicate are a 5G NR radio access network (5G NR-RAN) 120, an LTE radio access network (LTE-RAN) 122 and a wireless local access network (WLAN) 124. Therefore, the UEs 110, 112 may include a 5G NR chipset to communicate with the 5G NR-RAN 120, an LTE chipset to communicate with the LTE-RAN 122 and an ISM chipset to communicate with the WLAN 124. However, the UEs 110, 112 may also communicate with other types of networks (e.g. legacy cellular networks) and the UE 110 may also communicate with networks over a wired connection. With regard to the exemplary embodiments, the UEs 110, 112 may establish a connection with the 5G NR-RAN 120 and/or the LTE-RAN 122.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UEs 110, 112 may connect to the 5G NR-RAN 120 via at least one of the next generation nodeB (gNB) 120A and/or the gNB 120B. Reference to two gNBs 120A, 120B is merely for illustrative purposes. The exemplary embodiments may apply to any appropriate number of gNBs. For example, the UEs 110, 112 may simultaneously connect to and exchange data with a plurality of gNBs in a multi-cell CA configuration. The UEs 110, 112 may also connect to the LTE-RAN 122 via either or both of the eNBs 122A, 122B, or to any other type of RAN, as mentioned above. In the network arrangement 100, the UE 110 is shown as having a connection to the gNB 120A, while the UE 112 is shown as having a connection to gNB 120B.

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network, e.g. the 5GC for NR. The cellular core network 130 also manages the traffic that flows between the cellular network and the Internet 140.

The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
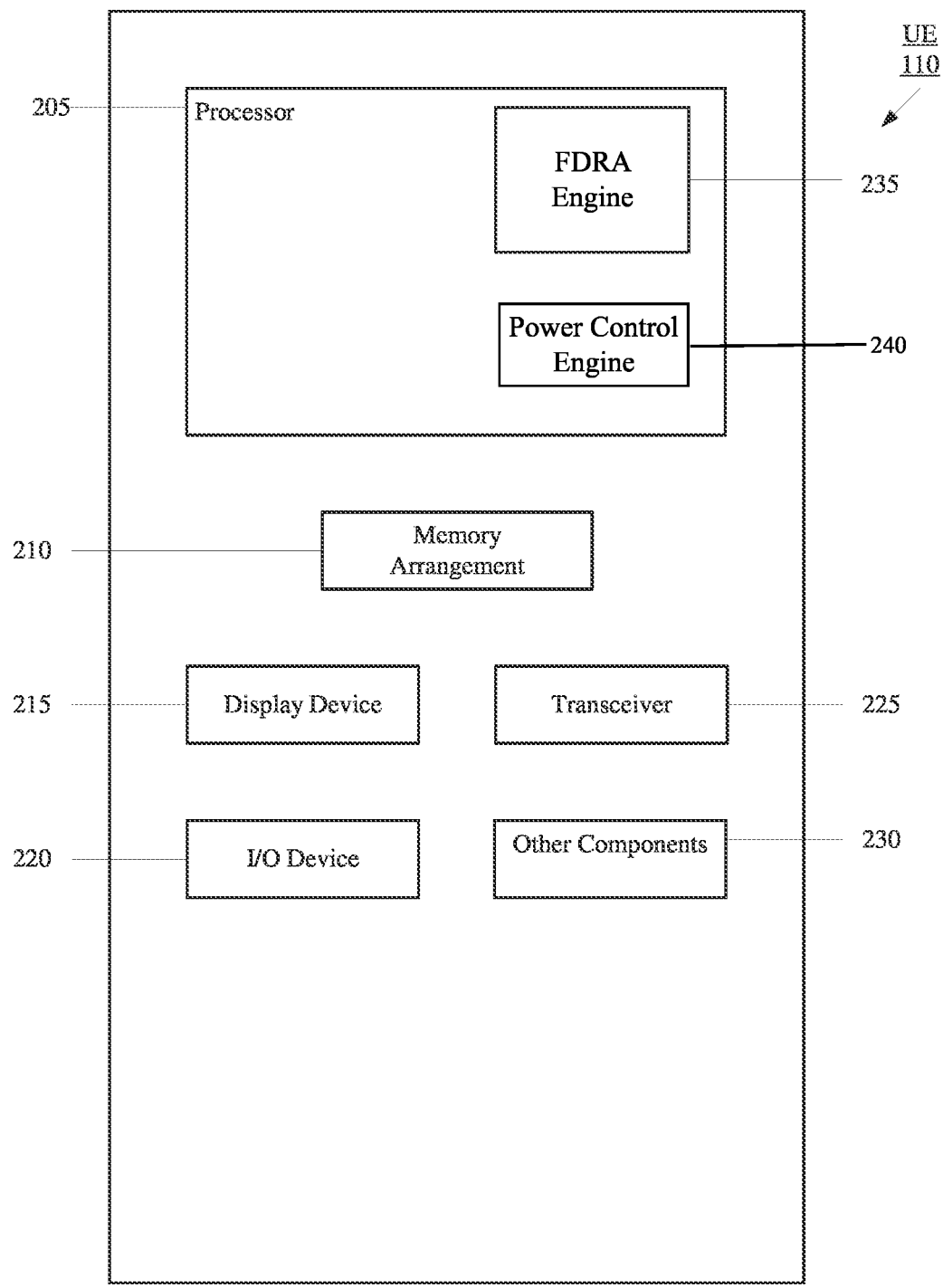
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc. The UE 110 illustrated in FIG. 2 may also represent the UE 112.

The processor 205 may be configured to execute a plurality of engines for the UE 110. For example, the engines may include an FDRA engine 235 for performing operations including receiving an FDRA configuration from the network for at least one FDRA mode and performing a UL transmission based on the network configuration, to be described in detail below. The engines may also include a power control engine 240 for performing operations including measuring a DL reference signal (RS) to estimate the DL pathloss and performing power headroom reporting (PHR) to inform the network of PH for the component carriers of an active beam, to be described in detail below.

The above referenced engines being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G-NR RAN 120, the LTE RAN 122 etc. Accordingly, the transceiver 225 may operate on a variety of different frequencies or channels (e.g., set of consecutive frequencies). For example, the transceiver 225 may operate on the unlicensed spectrum when e.g. NR-U is configured.

Figure 3:
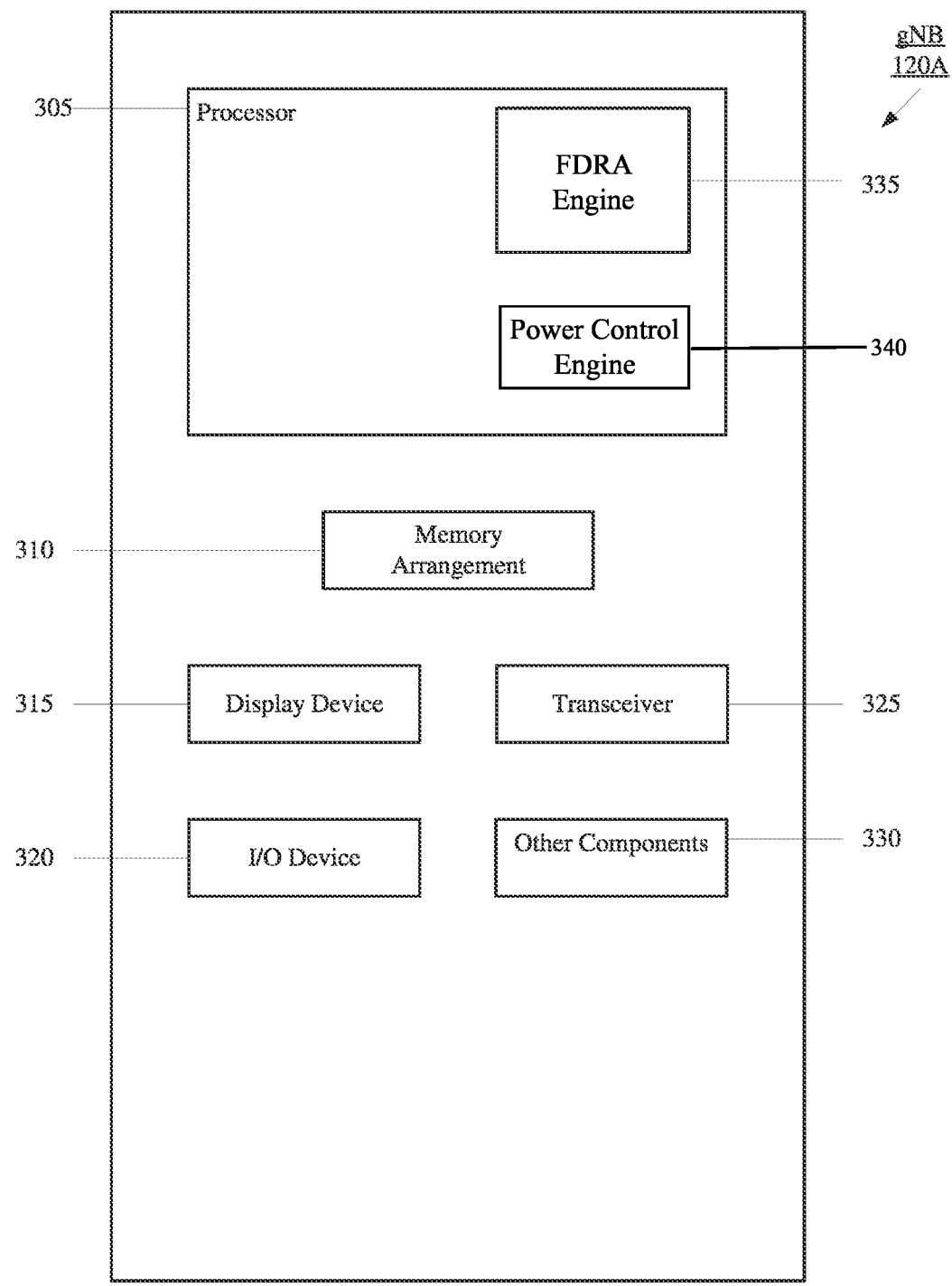
FIG. 3 shows an exemplary network cell according to various exemplary embodiments.

FIG. 3 shows an exemplary network cell, in this case gNB 120A, according to various exemplary embodiments. As noted above with regard to the UE 110, the gNB 120A may represent a cell providing services as a PCell or an SCell, or in a standalone configuration with the UE 110. The gNB 120A may represent any access node of the 5G NR network through which the UEs 110, 112 may establish a connection and manage network operations. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, an audio input device, an audio output device, a battery, a data acquisition device, ports to electrically connect the gNB 120A to other electronic devices, etc.

The processor 305 may be configured to execute a plurality of engines of the gNB 120A. For example, the engines may include an FDRA engine 335 for performing operations including configuring at least one FDRA mode for a UE and signaling an FDRA mode for the UE to use for an UL transmission, to be described in detail below. The engines may also include a power control engine 340 for performing operations including configuring an RS for the UE to perform DL pathloss measurements on and receiving a PHR from the UE.

The above noted engines each being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary embodiments may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UEs 110, 112 and any other UE in the system 100. The transceiver 325 may operate on a variety of different frequencies or channels (e.g., set of consecutive frequencies). Therefore, the transceiver 325 may include one or more components (e.g., radios) to enable the data exchange with the various networks and UEs.

FDRA Modes

In current NR design, the minimum resource allocation granularity in the frequency domain is limited to one physical resource block (PRB). For unlicensed operation, maximum power spectral density (PSD) requirements exist in many different regions. The PSD is a measure of signal power as a function of frequency. In most cases, the maximum PSD requirement is stated with a resolution bandwidth of 1 MHz. The implication of the PSD requirement on the physical layer design is that, without proper design, a signal with a small transmission bandwidth will be limited in transmission power. This can negatively affect the coverage of the operation. For example, the maximum PSD requirement is a binding condition that requires changes to UL transmissions in the unlicensed spectrums.

For NR operation in the 52.6 to 71 GHz frequency range, the impacts of phase noise on NR operations in this frequency range may be more pronounced than those on NR operations in FR2. The subcarrier spacing (SCS) may be increased to 480 kHz while balancing common phase error (CPE) and inter-symbol-interference (ISI) effects. Although a single PRB with a 480 kHz SCS spans 480×12=5.76 MHz, there is still a need to support interlace-based transmission so as to ensure adequate UL coverage for a power boosting operation.

According to certain aspects of the present disclosure, different frequency domain resource allocation (FDRA) modes may be defined for uplink (UL) transmission. In a first FDRA mode, the minimum basic FDRA unit comprises a set of '$K_1$' consecutive resource blocks (RBs), where $K_1$ is a function of regulatory requirements for a maximum PSD and subcarrier spacing, $K_1=f(PSD,SCS)$. The bitmap for signaling the configuration of the first mode, to be discussed in further detail below, is of size $P_{Mode1}=\lceil N_{BWP}/K_1 \rceil$, wherein $N_{BWP}$ is a number of Bandwidth Parts (BWP) allocated for a UL transmission.

In a second FDRA mode, an interlace-based structure allows the UE to occupy every 1 MHz with at least one subcarrier block (SCB) and utilize the maximum transmission power, thus improving the UL coverage. The minimum transmission unit is one interlace including 'M' adjacent subcarriers (one SCB) in each occupied physical resource block (PRB), the interlaces spanning a bandwidth of 'N' PRBs. The SCBs with M subcarriers are spaced equally in the frequency domain over the 'N' occupied PRBs. In various designs, M may be equal to, for example, 1, 3, 6 or 12, which may be configurable by a gNB or dynamically signaled by a scheduling downlink control information (DCI) Format, depending on, for example, the scheduled transport block size for a given scheduling opportunity. In other exemplary embodiments, a separate M value may be configured by higher-layer parameters for different UL channels, e.g. a Physical Uplink Control Channel (PUCCH) and a Physical Uplink Shared Channel (PUSCH). Multiple interlaces of SCBs may be defined where each interlace $k \in \{0, 1, \ldots, K_2-1\}$ comprises SCBs $\{0, K_2+k, 2K_2+k, 3K_2+k \ldots\}$, with $K_2$ being the number of interlaces in the FDRA unit, depending on the SCS. The relation between the interlace SCB $n_{ISCB,k}^u \in \{0, 1, \ldots\}$ and Interlace k and the RB index $n_{RB}^u$ is determined by $n_{RB}^u = K*n_{ISCB,k}^u + \mod(k, K_2))/(N_{SC}^{RB}/M)$.

Figure 4:
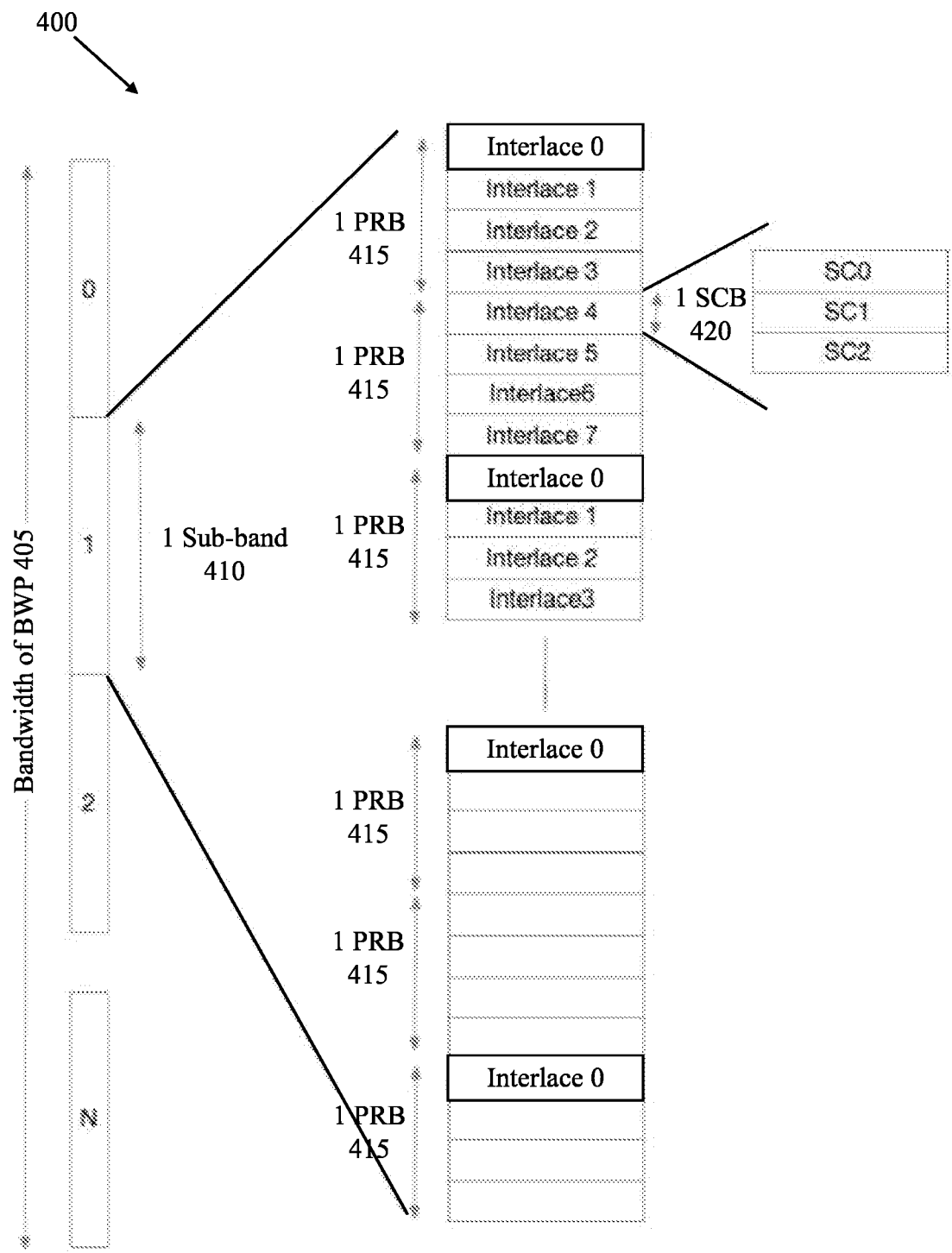
FIG. 4 shows an exemplary subcarrier block (SCB) based interlaced frequency domain resource allocation (FDRA) structure according to various exemplary embodiments.

FIG. 4 shows an exemplary subcarrier block (SCB) based interlaced frequency domain resource allocation (FDRA) structure 400 according to various exemplary embodiments. The FDRA structure 400 relates to the second FDRA mode discussed above, including the assumptions $K_2=8$ and M=3, $K_2$ being the number of interlaces in the minimum FDRA unit (dependent on SCS) and M being the number of adjacent subcarriers in an SCB. The inter-SCB distance between two consecutive SCBs is 11.52 MHz»1 MHz.

As shown in FIG. 4, an allocated BWP 405 for the UL transmission comprises a plurality of sub-bands 410, each sub-band comprising a plurality of PRBs 415. In the exemplary FDRA structure 400, each PRB 415 comprises four subcarrier blocks (SCB) 420, each SCB comprising M=3 consecutive subcarriers. A given SCB 420 corresponds to one of the 8 interlaces. Thus, a given interlace, e.g. Interlace 0, comprises a 7 PRB spacing between interlaces.

When indicating an SCB-based interlaced FDRA, the FDRA field includes a first sub-field for a sub-band indicator, the sub-band indicator providing the sub-band allocation information using a bitmap approach or a start and length indicator value (SLIV) based approach to indicate the starting and number of consecutive sub-bands. The FDRA field also includes a second sub-field for interlace allocation, which may also be indicated based on a bitmap approach or SLIV-based signaling.

A variety of approaches may be considered for FDRA mode signaling. In a first approach, one of the two FDRA modes may be configured by higher layers. For example, the FDRA mode may be provided in a system information block (SIB) and applied for all UEs in the cell. Alternatively, the FDRA mode may be explicitly configured by dedicated RRC signaling on a per UE basis. In some designs, the UE may be configured with the first FDRA mode when a large packet size is expected in relation to a currently running application. Additionally, in some designs, the UE may be configured with the second FDRA mode when a smaller packet size is expected, so as to leverage the maximum transmission power without violating the regional PSD requirement.

In a second approach, if both the first and second modes are configured for the UE, a mode indicator (MI) field in the scheduling DCI Format can be used to indicate FDRA mode for frequency domain resource allocation. In one example, a 1-bit MI field may be introduced, where a bit value of 0 indicates the first FDRA mode and a bit value of 1 indicates the second FDRA mode. The first or second FDRA mode may be indicated by using a most significant bit (MSB). The number of bits for resource assignment is determined as the Max($P_{Mode}$, $P_{Mode1}$), where $P_{Mode1}$, $P_{Mode2}$ is the number of bits determined for the first FDRA mode and the second FDRA mode, respectively.

Figure 5:
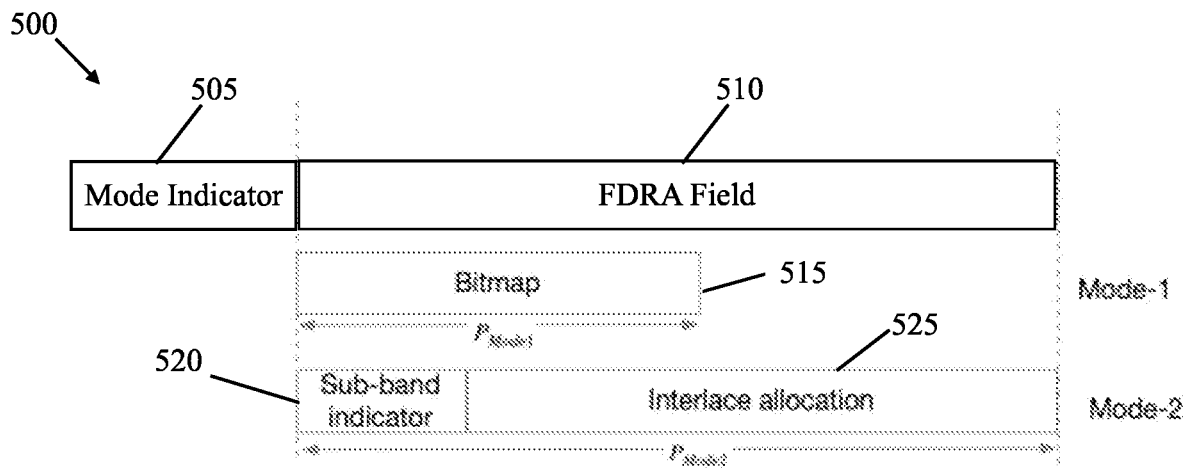
FIG. 5 shows an exemplary DCI format to dynamically indicate the FDRA mode to be used for an uplink transmission according to various exemplary embodiments.

FIG. 5 shows an exemplary DCI format 500 to dynamically indicate the FDRA mode to be used for an uplink transmission according to various exemplary embodiments. The DCI format 500 may be used when both the first and second FDRA modes are configured for the UE. The DCI format 500 includes a mode indicator (MI) field 505 and an FDRA field 510. When the first FDRA mode is being signaled, a bitmap 515 may be used in the FDRA field 510 in accordance with the bitmap size $P_{Mode1}$, discussed above. When the second FDRA mode is being signaled, a sub-band indicator field 520 and an interlace allocation field 525 may be used in the FDRA field 510 in accordance with the bitmap size $P_{Mode2}$, discussed above. The sub-band indicator field 520 and the interlace allocation field 525 may utilize either a bitmap approach or a SLIV-based approach.

Figure 6:
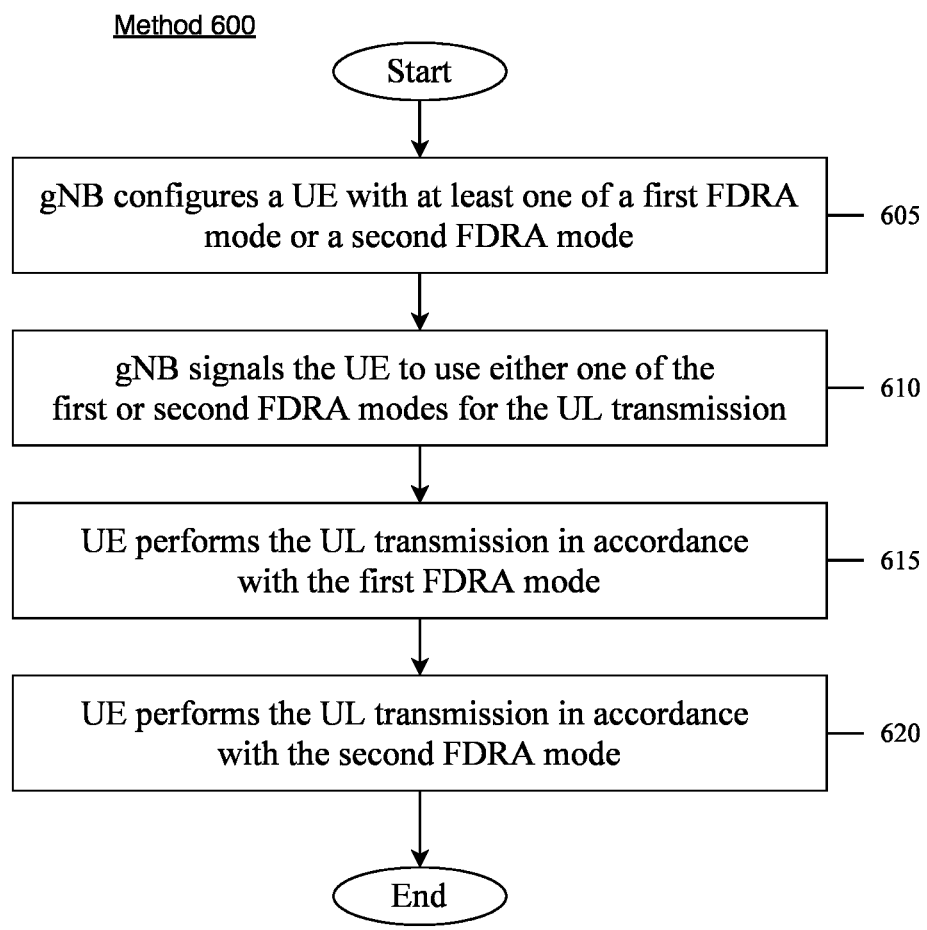
FIG. 6 shows a method for configuring a frequency domain resource allocation (FDRA) mode for an uplink (UL) transmission according to various exemplary embodiments.

FIG. 6 shows a method 600 for configuring a frequency domain resource allocation (FDRA) mode for an uplink (UL) transmission according to various exemplary embodiments. In 605, a gNB configures a UE with at least one of a first FDRA mode or a second FDRA mode. As described above, the first FDRA mode utilizes an FDRA unit comprising a set of consecutive RBs, while the second FDRA mode utilizes an interlaced FDRA unit. The gNB may configure the one or two FDRA modes via higher layer signaling.

In 610, when both of the first and second modes are configured for the UE, the gNB signals the UE to use either one of the first or second FDRA modes for the UL transmission. The mode may be indicated using, for example, a scheduling DCI Format comprising the MI field. Depending on the mode being signaled, the DCI Format may include either a resource allocation bitmap (for the first mode) or both of a sub-band indicator field and an interlace allocation field, which may utilize either of a bitmap or SLIV-based approach.

In 615, when the first FDRA mode is configured, the UE performs the UL transmission in accordance with the first FDRA mode. In 620, when the second FDRA mode is configured, the UE performs the UL transmission in accordance with the second FDRA mode.

Power Control for UL Transmission

According to some exemplary embodiments, the UE may perform power control for uplink (UL) transmissions based on a downlink (DL) pathloss estimation. The UE may be configured by high layers to use a reference signal (RS) resource from a system synchronization block (SSB), e.g. either a synchronization signal (SS) or a physical broadcast channel (PBCH), to estimate the DL pathloss for power control on the UL. In some exemplary embodiments, the RS that may be configured for pathloss estimation is limited to the CSI-RS or SSB transmitted in a discovery RS window. The pathloss measurement may be a reference signal received power (RSRP) measurement on the RS.

Regardless of the outcome of a Listen-Before-Talk (LBT) operation performed across component carriers (CCs), for the RSRP DL pathloss measurement, the UE may assume the energy per resource element (EPRE) of the configured RS/SSB is constant across the transmission bandwidth and constant across all slots. If different configuration information is received, a corresponding averaging operation may be conducted at the UE side to improve the accuracy of the pathloss estimation.

Figure 7:
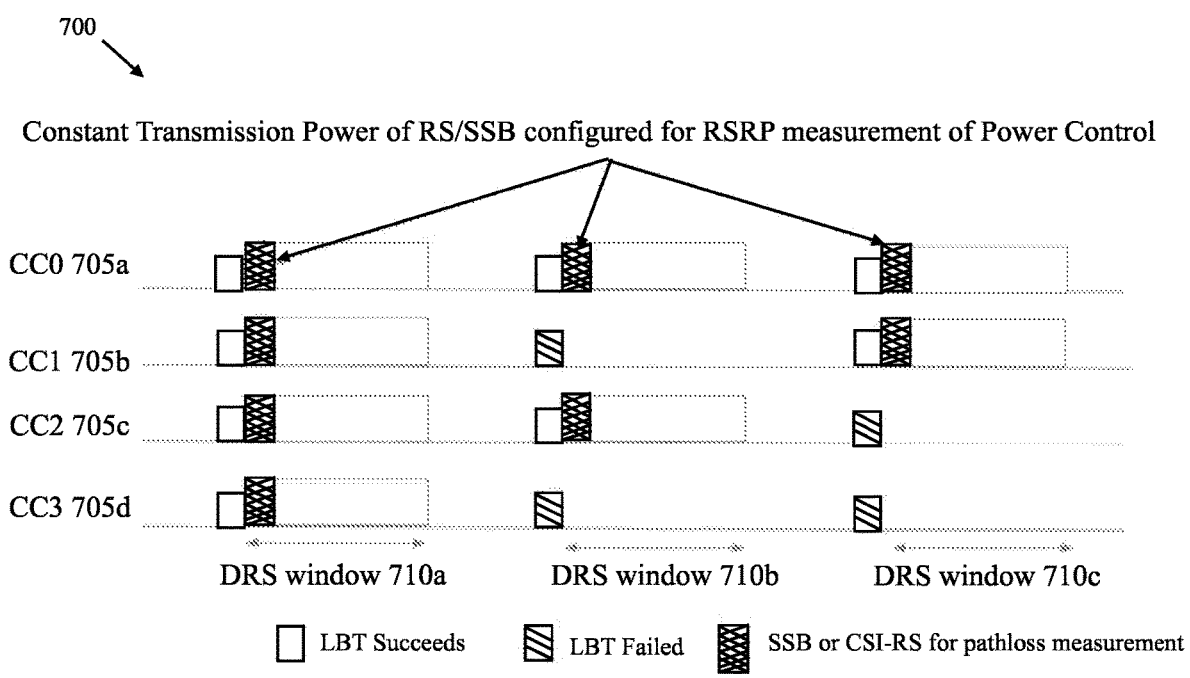
FIG. 7 provides an exemplary downlink (DL) pathloss measurement operation for a user equipment (UE) according to various exemplary embodiments.

FIG. 7 provides an exemplary downlink (DL) pathloss measurement operation 700 for a user equipment (UE) according to various exemplary embodiments. The exemplary operation 700 includes four component carriers (CCs) 705, i.e. CC0 705a, CC1 705b, CC2 705c and CC3 705d. Three discovery reference symbol (DRS) windows 710 are shown, e.g., DRS windows 710a, 710b and 710c. Prior to the gNB transmitting the RS for pathloss measurement, e.g. the SSB or CSI-RS, an LBT operation is first performed. When the LBT operation is successful, the RS is then transmitted.

In the exemplary operation 700, the LBT operation fails on CC1 705b during DRS window 710b, on CC2 705c during the DRS window 710c, and on CC3 705d during the DRS windows 710b and 710c. Although the number of CCs passing LBT operation varies across the DRS windows 710, the transmission power of the RS transmissions on CC0 705a are kept constant by the gNB such that an averaging operation can be conducted on the measurement of these RS resources at the UE side. The power is underutilized in DRS windows 710b and 710c at the gNB side, as power boosting is not allowed so as to keep the constant power.

A power headroom report (PHR) is used to indicate how much transmission power remains for a UE to use in view of the power being used for a UL transmission. To report the PH, in a first step, the uplink CCs are divided into a set of groups based on the associated UL beam index. The CC grouping information may be reported as part of UE capability or implicitly determined based on some predefined rule. As one example, the CCs in a same band may be grouped into one CC group.

In a second step, for the PHR report, the UE may include only the octets containing a Power Headroom field and $P_{CMAX,f,c}$ for the CCs or serving cells in the same group with the active/scheduled UL beam. Correspondingly, a single octet bitmap may be used for indicating the presence of PH per serving cell when there are less than 8 active UL beams in the serving cell, otherwise four octets are used.

Figure 8:
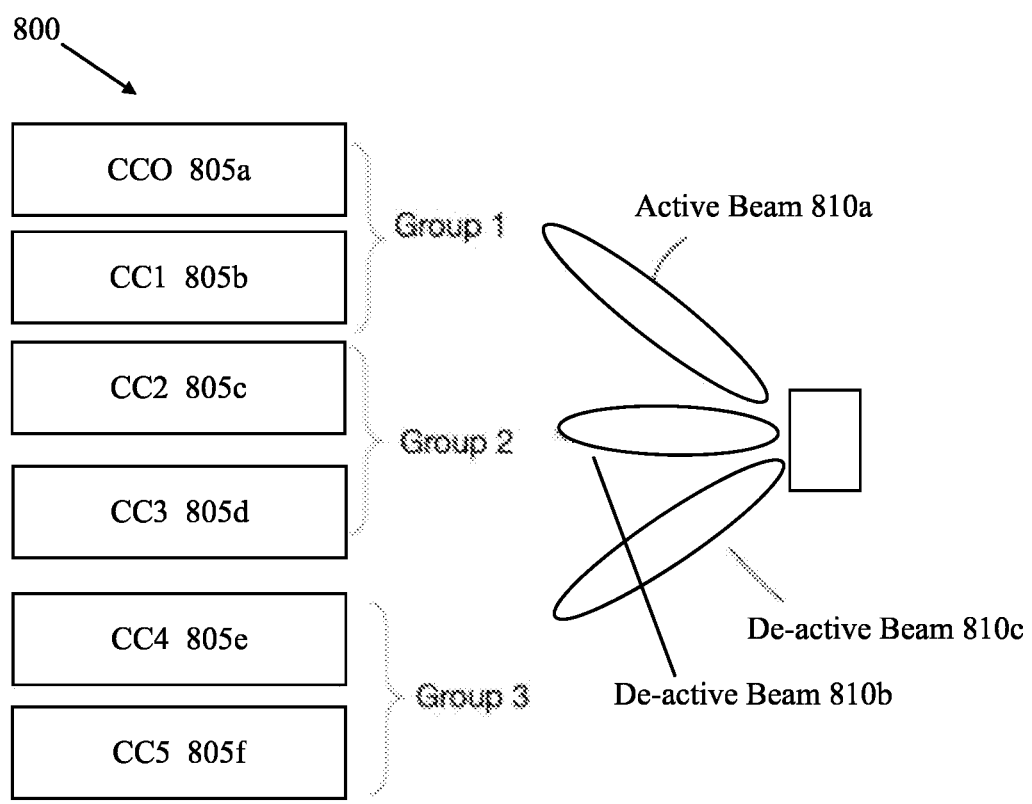
FIG. 8 shows an exemplary CC group-dependent power headroom reporting operation based on an associated UL beam configuration according to various exemplary embodiments.

FIG. 8 shows an exemplary CC group-dependent power headroom reporting operation 800 based on an associated UL beam configuration according to various exemplary embodiments. In the exemplary operation 800, the UE is transmitting on six component carriers 805 and is capable of transmitting three beams 810 in a time division multiplex (TDM) manner, where beam 810a covers CC0 805a and CC1 805b, beam 810b covers CC2 805c and CC3 805d, and beam 810c covers CC4 805e and CC5 805f. Based on the exemplary embodiments described herein, the UE reports PH for CC0 805a and CC1 805b only, instead of for all active CCs, if the PHR is triggered for and the PUSCH is transmitted on CC0 805a or CC1 805b (associated with active beam 810a), while the remaining CCs 805 are not reported for deactivated beams 810b and 810c.

Figure 9:
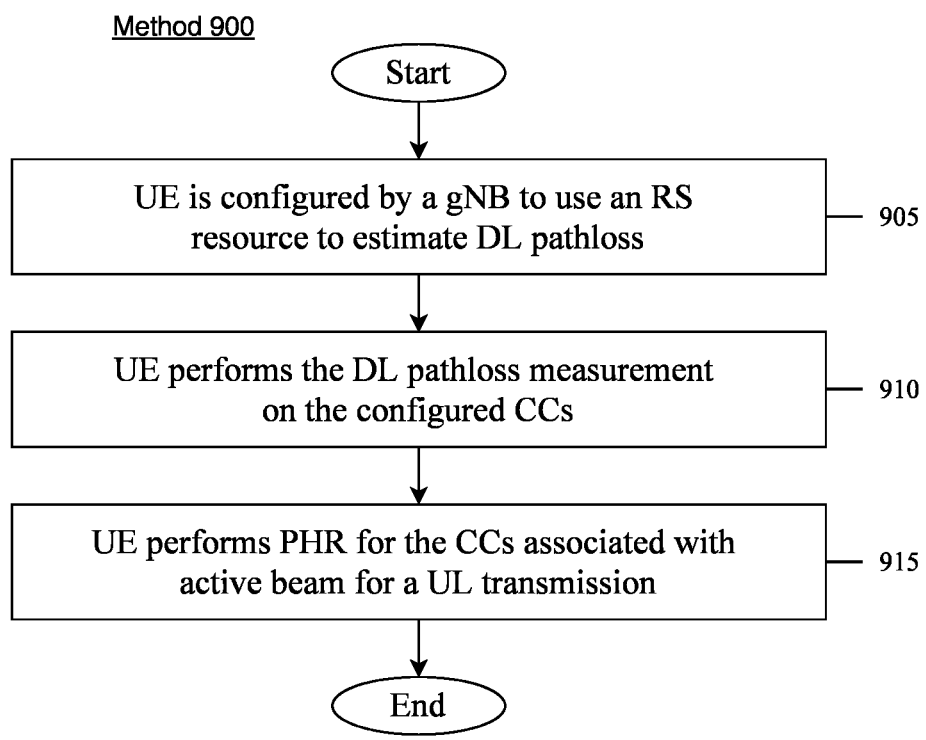
FIG. 9 shows a method for power headroom reporting (PHR) according to various exemplary embodiments.

FIG. 9 shows a method 900 for power headroom reporting (PHR) according to various exemplary embodiments. In 905, a UE is configured by a gNB to use an RS resource to estimate DL pathloss. As described above, the RS may be, e.g., a CSI-RS or an SS from the SSB.

In 910, the UE performs the DL pathloss measurement on the configured CCs. An averaging operation may be used when multiple estimations are performed across multiple slots. In some examples, an LBT operation for the CC may fail for a given CC for a given slot, but the UE may assume the EPRE of the configured RS is constant across the transmission bandwidth and across all slots.

In 915, the UE performs PHR for the CCs associated with the active beam for a UL transmission. The CCs covered by a given beam may be grouped so that only CC groups associated with an active UL beam may be reported in the PHR.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various aspects each having different features in various combinations, those skilled in the art will understand that any of the features of one aspect may be combined with the features of the other aspects in any manner not specifically disclaimed or which is not functionally or logically inconsistent with the operation of the device or the stated functions of the disclosed aspects.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

The invention claimed is:

1. A processor configured to perform operations comprising:
   receiving a frequency domain resource allocation (FDRA) configuration from a network, the FDRA configuration comprising at least one of a first FDRA mode or a second FDRA mode, wherein the first FDRA mode utilizes an FDRA unit comprising a set of consecutive resource blocks (RBs) and the second FDRA mode utilizes an FDRA unit comprising a set of interlaced RBs, wherein the FDRA unit for the first mode comprises K consecutive RBs, wherein K is a function of regulatory requirements for a maximum power spectral density (PSD) and a subcarrier spacing (SCS) to be used for the UL transmission;
   when both of the first and second FDRA modes are configured, receiving a signal indicating which one of the two FDRA modes are to be used for an uplink (UL) transmission; and
   performing the UL transmission in accordance with the indicated FDRA mode.

2. The processor of claim 1, wherein the FDRA unit for the second mode comprises an interlace of M adjacent subcarriers spaced equally over N RBs.

3. The processor of claim 2, wherein M is configured or dynamically signaled by the network and is based on, at least, a transport block size of the UL transmission, and wherein K is based on, at least, the SCS.

4. The processor of claim 1, wherein, when both of the first and second FDRA modes are configured, the FDRA mode indication is included in a scheduling downlink control information (DCI) Format comprising a mode indicator (MI) field.

5. The processor of claim 4, wherein, when the first FDRA mode is indicated, an FDRA field in the scheduling DCI Format comprises a bitmap for the FDRA.

6. The processor of claim 4, wherein, when the second FDRA mode is indicated, an FDRA field in the scheduling DCI Format comprises a sub-band indicator field and an interlace allocation field, the field utilizing either one of a bitmap or a start and length indicator value (SLIV).

7. A user equipment (UE), comprising:
   a transceiver configured to connect to a base station; and
   a processor communicatively coupled to the transceiver and configured to perform operations comprising:
   receiving a frequency domain resource allocation (FDRA) configuration from the base station, the FDRA configuration comprising at least one of a first FDRA mode or a second FDRA mode, wherein the first FDRA mode utilizes an FDRA unit comprising a set of consecutive resource blocks (RBs) and the second FDRA mode utilizes an FDRA unit comprising a set of interlaced RBs, wherein the FDRA unit for the first mode comprises K consecutive RBs, wherein K is a function of regulatory requirements for a maximum power spectral density (PSD) and a subcarrier spacing (SCS) to be used for the UL transmission;
   when both of the first and second FDRA modes are configured, receiving a signal indicating which one of the two FDRA modes are to be used for an uplink (UL) transmission; and
   performing the UL transmission in accordance with the indicated FDRA mode.

8. The UE of claim 7, wherein the FDRA unit for the second mode comprises an interlace of M adjacent subcarriers spaced equally over N RBs.

9. The UE of claim 8, wherein M is configured or dynamically signaled by the base station and is based on, at least, a transport block size of the UL transmission, and wherein K is based on, at least, the SCS.

10. The UE of claim 7, wherein, when both of the first and second FDRA modes are configured, the FDRA mode indication is included in a scheduling downlink control information (DCI) Format comprising a mode indicator (MI) field.

11. The UE of claim 10, wherein, when the first FDRA mode is indicated, an FDRA field in the scheduling DCI Format comprises a bitmap for the FDRA.

12. The UE of claim 10, wherein, when the second FDRA mode is indicated, an FDRA field in the scheduling DCI Format comprises a sub-band indicator field and an interlace allocation field, the field utilizing either one of a bitmap or a start and length indicator value (SLIV).

13. A method, comprising:
   receiving a frequency domain resource allocation (FDRA) configuration from a network, the FDRA configuration comprising at least one of a first FDRA mode or a second FDRA mode, wherein the first FDRA mode utilizes an FDRA unit comprising a set of consecutive resource blocks (RBs) and the second FDRA mode utilizes an FDRA unit comprising a set of interlaced RBs, wherein the FDRA unit for the first mode comprises K consecutive RBs, wherein K is a function of regulatory requirements for a maximum power spectral density (PSD) and a subcarrier spacing (SCS) to be used for the UL transmission;

when both of the first and second FDRA modes are configured, receiving a signal indicating which one of the two FDRA modes are to be used for an uplink (UL) transmission; and performing the UL transmission in accordance with the indicated FDRA mode.

14. The method of claim 13, wherein the FDRA unit for the second mode comprises an interlace of M adjacent subcarriers spaced equally over N RBs.

15. The method of claim 14, wherein M is configured or dynamically signaled by the network and is based on, at least, a transport block size of the UL transmission, and wherein K is based on, at least, the SCS.

16. The method of claim 13, wherein, when both of the first and second FDRA modes are configured, the FDRA mode indication is included in a scheduling downlink control information (DCI) Format comprising a mode indicator (MI) field.

17. The method of claim 16, wherein, when the first FDRA mode is indicated, an FDRA field in the scheduling DCI Format comprises a bitmap for the FDRA.

18. The method of claim 16, wherein, when the second FDRA mode is indicated, an FDRA field in the scheduling DCI Format comprises a sub-band indicator field and an interlace allocation field, the field utilizing either one of a bitmap or a start and length indicator value (SLIV).

* * * * *